United States Patent
Thomson et al.

(10) Patent No.: US 9,100,482 B2
(45) Date of Patent: Aug. 4, 2015

(54) MOBILE MONITORING FOR SUPERVISORS

(71) Applicant: Avaya Inc., Basking Ridge, NJ (US)

(72) Inventors: Rodney A. Thomson, Westminster, CO (US); Brian J. Reynolds, Firestone, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/926,879

(22) Filed: Jun. 25, 2013

(65) Prior Publication Data
US 2014/0376711 A1    Dec. 25, 2014

(51) Int. Cl.
H04M 3/00  (2006.01)
H04M 3/51  (2006.01)
H04M 3/20  (2006.01)
H04M 3/22  (2006.01)
H04M 3/42  (2006.01)

(52) U.S. Cl.
CPC .............. *H04M 3/5175* (2013.01); *H04M 3/20* (2013.01); *H04M 3/2281* (2013.01); *H04M 3/42221* (2013.01); *H04M 2201/42* (2013.01)

(58) Field of Classification Search
CPC ..... H04M 3/5175; H04M 3/523; H04M 3/51; H04M 3/42221; H04M 3/5233
USPC ............................ 379/265.06, 265.01–265.03
See application file for complete search history.

(56) References Cited

U.S. PATENT DOCUMENTS

| | | | |
|---|---|---|---|
| 8,687,785 B2 * | 4/2014 | Katkam et al. ................. | 379/198 |
| 2010/0235218 A1 | 9/2010 | Erhart et al. | |
| 2010/0296417 A1 | 11/2010 | Steiner | |
| 2011/0038474 A1 * | 2/2011 | Omiya ..................... | 379/265.01 |
| 2011/0125793 A1 | 5/2011 | Erhart et al. | |
| 2011/0125826 A1 | 5/2011 | Erhart et al. | |
| 2011/0255683 A1 | 10/2011 | Flockhart et al. | |
| 2012/0098653 A1 * | 4/2012 | Slack ............................ | 340/435 |
| 2012/0237016 A1 | 9/2012 | Hegde et al. | |
| 2012/0321059 A1 | 12/2012 | O'Connor et al. | |

FOREIGN PATENT DOCUMENTS

EP    1187442    3/2002

* cited by examiner

*Primary Examiner* — Rasha Al Aubaidi
(74) *Attorney, Agent, or Firm* — Sheridan Ross P.C.

(57) ABSTRACT

A mobile service observing integration system efficiently utilizes multi-functional smart devices providing operating system support for native applications and application programming interface support for third-party applications, allowing seamless mobile communication between a contact center and its agents and supervisors.

19 Claims, 4 Drawing Sheets

MOBILE MONITORING FOR SUPERVISORS

FIELD OF THE DISCLOSURE

The present disclosure is generally directed toward communications and more specifically toward contact centers.

BACKGROUND

A supervisor walking a typical contact center floor is generally only able to hear one side of a customer conversation, ambient noise permitting. Additionally, the supervisor doesn't always have immediate access to customer information or current statistics, though the supervisor may be able to see a display of some statistics if collocated with agents on the contact center floor. It is important for the supervisor to monitor the quality of customer service that the agents provide. Sometimes, the supervisor needs to intervene if an agent is having problems, getting angry, providing incorrect information, or failing in some other capacity. Other times, the supervisor needs to assess performance of the agents, including outstanding performance.

A common method for the supervisor to monitor the agent is to physically go to a telephone and connect to a call to participate in call monitoring, recording, and flagging for later review. The method is known as service observing (SO). A typical SO feature allows the supervisor to listen in and possibly participate on calls routed to the agent or group of agents, to a particular agent station, or calls that come into a particular directory number. The service observer may request to observe a particular type or set of calls. It is possible and common to service observe a Vector Directory Number (VDN), where the Automatic Call Distributor (ACD) sets up specific routing (e.g., service observing) for all calls that come in to the VDN which may be serviced by more than one agent. The service observer can listen in for a portion of a call or for an entire call.

SO features have some limitations. An effective SO strategy requires knowledge in advance that a call or calls need service observing. The current way to connect to a call via a desk telephone requires that the agent is within close physical proximity to the supervisor, which precludes certain types of monitoring for remote agents and/or by remote supervisors. SO can also be highly stressful for the agent, prone to error, and/or introduce a delayed analysis and response.

SO is a common and useful feature, and most contact centers just live with the limitations. Typically, supervisors are collocated with agents for observation and are on the same server or the same network to make SO as widely available as possible. Certain agents or groups are often designated as a set that can be tagged for monitoring. However, SO is traditionally inflexible, meaning it has to be initiated a certain way from a hardphone, means of performing observations are limited, and there are limits on how many SO sessions can take place simultaneously.

SUMMARY

These and other needs are addressed by the various aspects, embodiments, and/or configurations of the present disclosure. The present disclosure is directed to a mobile monitoring solution that can allow a contact center supervisor to observe calls using smart devices from any location, thereby enabling a new level of efficiency for service observing (SO). A mobile SO module is proposed herein that is capable of displaying content dynamically from several sources to the smart devices through one or more application programming interfaces (APIs). The smart devices concurrently display native content integrated with content delivered by each of the APIs.

As an illustrative example, a supervisor would dial a Feature Access Code (FAC), get a dial tone, and then dial an extension number or agent login code. There may be two Feature Access Codes (FACs) from which to choose; one for listen-only and one for listen and speak. An optional tone may be played periodically to remind a caller and an agent that the call is monitored. Class of Restriction (COR) typically needs to be set to enable SO for a supervisor's extension, an agent extension, or a VDN to be monitored.

In one embodiment, the supervisor can passively listen in on agent conversations regardless of location and/or proximity. This can be accomplished by allowing the supervisor to choose the agent(s) to be monitored and have a service observing call initiated using a mobile device carried by the supervisor.

In this non-limiting example, the mobile device is not doing the SO; it is accessing the SO media via a centralized server that has access to the communication session between the agent and customer. The recording mechanism is handled by a recording server, which can be triggered by the supervisor's mobile device. Text-based assistance can also be achieved on the mobile device and the agent desktop via a Peer-to-Peer (P2P) connection.

In one embodiment, the centralized server may create a display or pop-up that the mobile device can present, giving the supervisor information on the agent and/or the customer. With the inclusion of recordings and real-time transcripts, the supervisor can access the contact in its entirety to be well-prepared to join the call. Since this removes the dependency of the supervisor to physically be located with the agents, remote agents as well as remote supervisors also benefit from this capability.

These and other advantages will be apparent from the disclosure.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The phrase "Call Management System (CMS)" as used herein refers to an Avaya application that includes database, administration, and reporting features to help businesses identify and take action on operational issues.

The phrase "class of restriction (COR)" as used herein refers to a telephony feature that allows an administrator to assign calling privileges.

The phrase "Automatic Call Distributor (ACD)" as used herein refers to a system or device that routes incoming calls to agents.

The phrase "Vector Directory Number (VDN)" as used herein refers to a telephone number on an ACD that sends an incoming call to a vector (set of functions) that can give a busy signal, route to a set of agents, play a recorded message, etc. A VDN is considered a virtual number since it is not associated with a specific device.

The phrase "feature access code (FAC)" as used herein refers to a telephony short code, typically consisting of a star (*) key and a set of numbers that have been administered to activate or deactivate a feature.

The phrase "Peer-to-Peer (P2P) computing and/or networking" as used herein refers to a distributed application architecture that allows "peers" (i.e., equivalent participants) to communicate and provide/share resources without a central server.

The phrase "application programming interfaces (APIs)" as used herein refers to software that allows software components to interact. The API typically includes a library with specifications for data structures, variables, routines, and object classes.

The term "user," "customer," or "client" denotes a party patronizing, serviced by, or otherwise doing business with a contact center or other type of enterprise.

The terms "determine," "calculate," and "compute," and variations thereof as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

Figure 1:
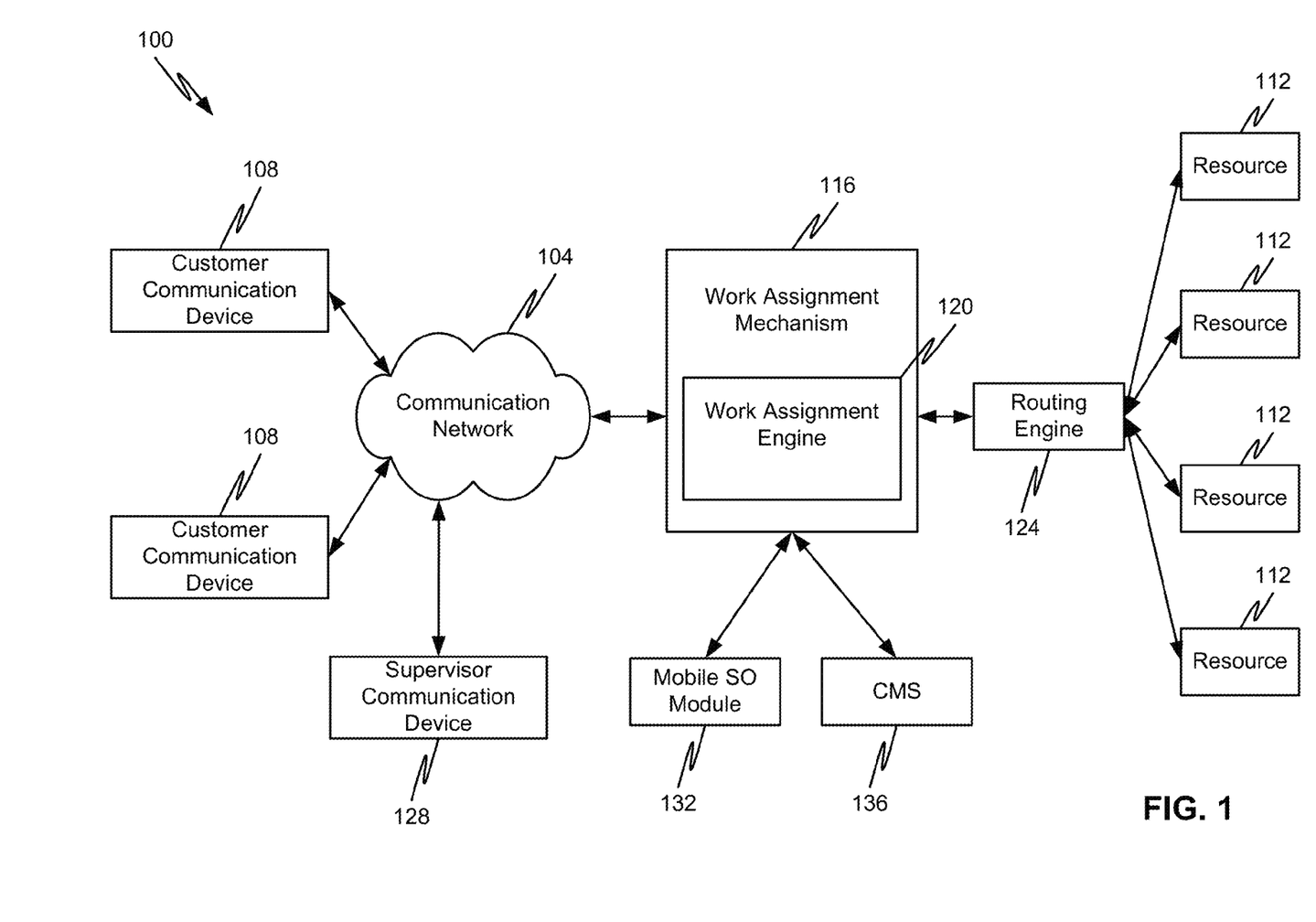
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering a contact center in which a plurality of resources 112 are distributed to handle incoming work items from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The communication device 128 may correspond to a supervisor communication device or collection of devices. In accordance with at least some embodiments of the present disclosure, a supervisor may utilize the communication device 128 to evaluate or help the servicing of a work item by a resource 112. The supervisor may utilize the communication device 128 to initiate or respond to interaction regarding work items with the work assignment mechanism 116, a mobile service observing module 132, elements within or outside of the communication network 104, and to processing resources 112.

The work assignment mechanism 116 may employ any queue-based or queueless work assignment algorithm. Examples of queue-based work assignment skill-based algorithms include, without limitation, a fairness algorithm, pacing algorithm (which inserts rests into the agents work queue), value-based algorithms, limited algorithms (such as Business Advocate™ by Avaya, Inc.), and outsourcing algorithms. Other algorithms may consider other types of data inputs and/or may treat certain data inputs differently.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 124 to connect the communication device 108 to the assigned resource 112.

Although the routing engine 124 is depicted as being separate from the work assignment mechanism 116, the routing engine 124 may be incorporated into the work assignment mechanism 116 or its functionality may be executed by the work assignment engine 120.

In accordance with at least some embodiments of the present disclosure, the customer communication devices 108 and the supervisor communication device(s) 128 may comprise any type of known communication equipment or collection of communication equipment. Examples of a suitable communication device 108, 128 include, but are not limited to, a personal computer, laptop, tablet, cellular phone, smartphone, telephone, or combinations thereof. In general, each communication device 108, 128 may be adapted to support video, audio, text, and/or data communications with other communication devices 108, 128 as well as the processing resources 112. The type of medium used by the communication device 108, 128 to communicate with other communication devices 108, 128 or processing resources 112 may depend upon the communication applications available on the communication device 108, 128.

In accordance with at least some embodiments of the present disclosure, the work item is sent toward a collection of processing resources 112 via the combined efforts of the work assignment mechanism 116 and routing engine 124. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112a-n connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can determine which of the plurality of processing resources 112 is qualified and/or eligible to receive the work item and further determine which of the plurality of processing resources 112 is best suited (or is the optimal processing resource) to handle the processing needs of the work item. In situations of work item surplus, the work assignment engine 120 can also make the opposite determination (i.e., determine optimal assignment of a work item resource to a resource). In some embodiments, the work assignment engine 120 is configured to achieve true one-to-one matching by utilizing bitmaps/tables and other data structures.

The work assignment mechanism 116 can communicate with the mobile service observing module 132 which may provide SO features. The work assignment mechanism 116 can communicate with a Call Management System (CMS) 136 which may provide integrated analysis and reporting on the performance of one agent, a group of agents, a single contact center site, or multiple contact center sites. The mobile service observing module 132 may additionally integrate CMS 136 data and application data for display on a user interface of the communication device 128. Applications may work in conjunction with the mobile service observing module 132, providing both native functionality and third-party functionality provided by an API.

Figure 2:
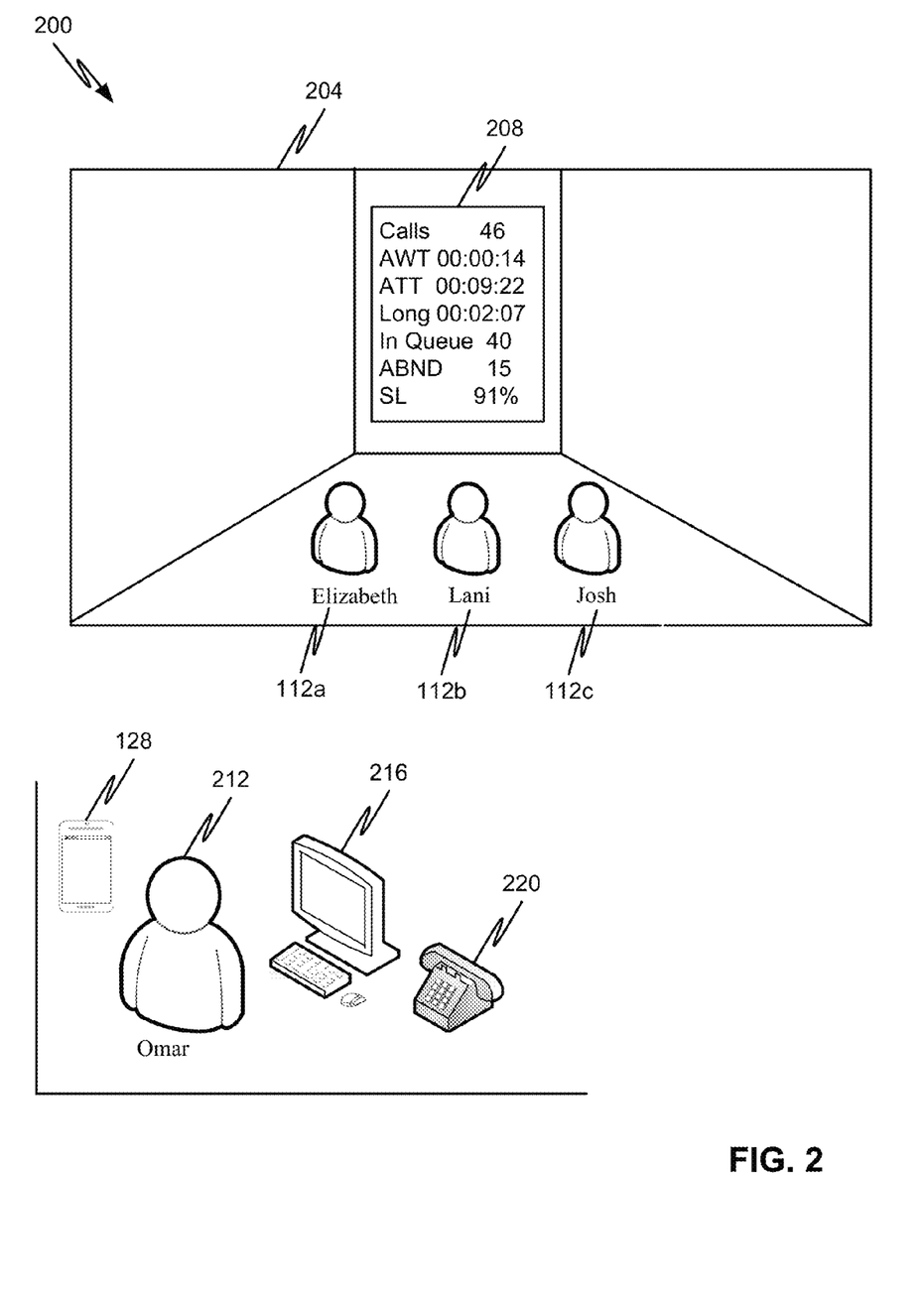
FIG. 2 is an example of a supervisor interaction with agents in accordance with embodiments of the present disclosure.

FIG. 2 depicts a contact center 200 in accordance with embodiments of the present disclosure. The phrase "contact center" as used herein refers to a company that manages client correspondence through a variety of mediums, including telephone, fax, email, mail, chat, text, etc. A contact center "floor" 204 typically contains resources 112, one or more supervisors 212, and one or more displays 208 (e.g., wall-mounted Light Emitting Diode (LED) displays).

The contact center floor 204 can contain one or more large, wall-mounted displays, commonly referred to as wallboards 208, operable to integrate with data sources. The wallboard 208 may display many types of information, including but not limited to, RSS feed data, statistics (e.g., Key Performance Indicators—KPIs), metrics, graphs, images, announcements, alerts, thresholds, and messages. The contact center 200 can include more or fewer elements, and elements of the contact center 200 can be arranged differently and interact differently than those shown in FIG. 2.

Contact center resources 112 may be agents at workstations and may be seated with a view of one or more wallboards 208. For example, Elizabeth 112a, Lani 112b, and Josh 112c may be resources 112 for the contact center 200, operable to receive and complete work items. Generally, the agent 112 can have a workstation that includes a telephone, a computer, a smart device, and other communication devices. As can be appreciated, the contact center floor 204 and the agent 112 workstations may comprise more or fewer of the elements listed. One or more supervisors 212 may be available to monitor activities on the contact center floor 204 and to assist, restrain, and train agents 112. Omar 212, for example, may have a workstation inside the facility or remote from the contact center floor 204. The supervisor workstation may include a land-line telephone 220, a computer 216, a smart device 128, or other communication devices.

In one embodiment, the supervisor 212 may have a communication device 128. One non-limiting example of the device 128 is a mobile or cordless device that is connected to other contact center components via wireless connections (e.g., 802.11N)/3G/4G/etc., and capable of browsing, telephony, and/or location. The device 128 may be a telephone or a tablet. More specifically, the supervisor communication device 128 may be a telephone or tablet, operable to run applications related to the supervision of the contact center floor 204. The supervisor communication device 128 may be operable to receive calls, short message service (SMS) texts, pop-ups, and data as well as operable to communicate with a wallboard module 128 and other contact center 200 elements.

Figure 3:
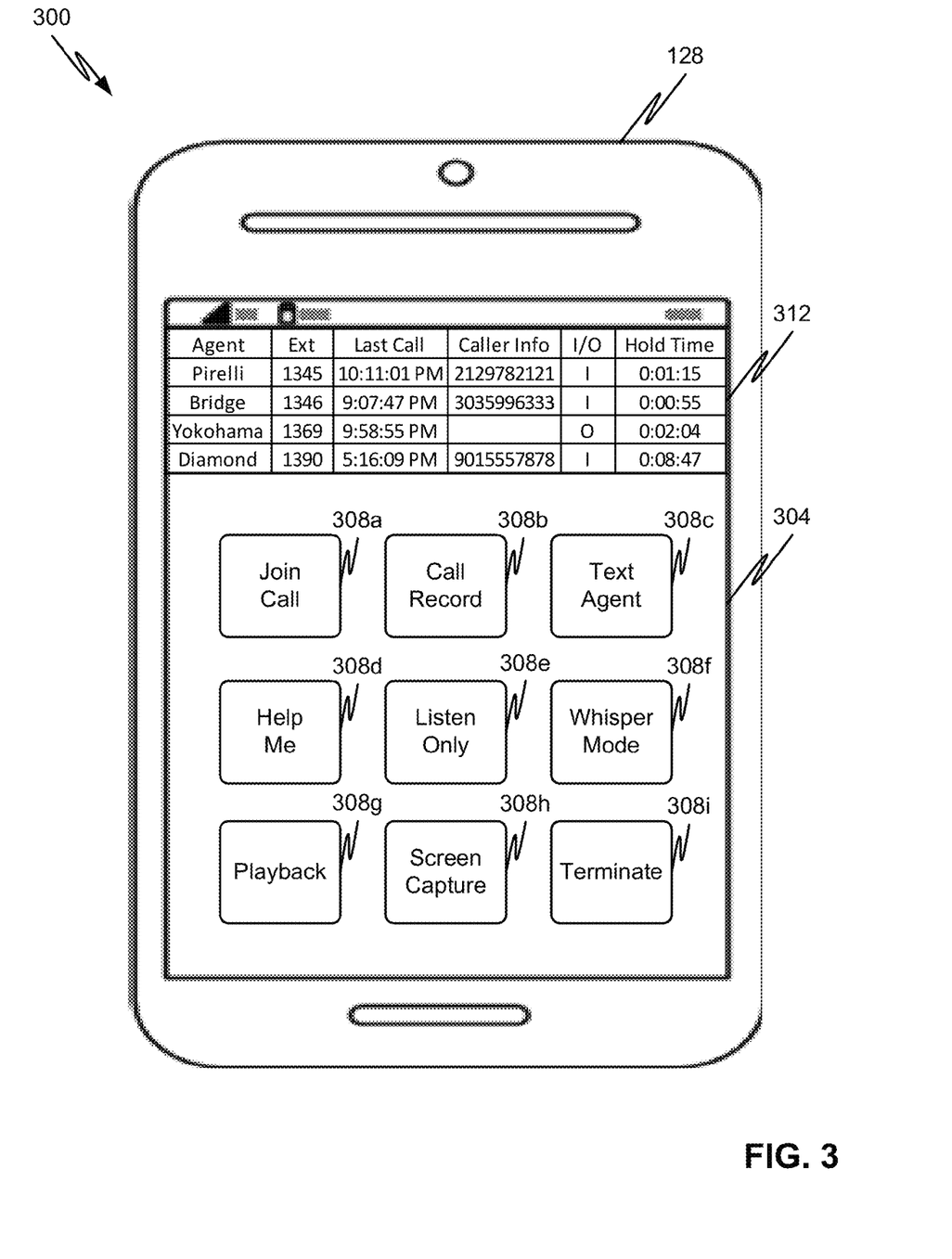
FIG. 3 depicts a user interface in accordance with embodiments of the present disclosure.

FIG. 3 depicts a user interface 300 in accordance with embodiments of the present disclosure. The user interface 300 can be provided by or in connection with a user output device (e.g., a display) of a supervisor communication device 128. The user interface 300 can be generated through or in connection with the operation of the mobile service observing module 132 which is operable to communicate with the work assignment mechanism 116, and/or in connection with a companion application, such as a specially provided application and/or a browser application, provided as part of an agent supervisor communication device 128 display. Accordingly, the user interface 300 is generally presented to a supervisor 212. Moreover, the user interface 300 can be interactive in that it can provide fields, buttons, menus, or other features to enable the user interface 300 to receive input from an agent 112, contact center 200 element, or a supervisor 212, as well as to present information to the supervisor 212 graphically.

A smartphone display 304 can present icons 308 for application and/or feature invocation to access, capture, and/or store information. Native applications, or applications that are installed directly on a smartphone 128, may include applications that are designed to run on a device's operating system and machine firmware. Examples of native applications on the smartphone 128 might include a Text Agent application 308c and a Terminate application 308i. Additionally, developers may develop third-party applications for use on the smartphone 128. APIs may allow the third-party applications to better integrate with the communication device's operating system and machine firmware. The API on the smartphone 128 may also allow third-party applications to multitask, thus increasing the available feature functionality of the smartphone 128. Examples of third-party applications might include a third-party Call Record application 308b and a Screen Capture application 308h.

The smartphone display 304 may display additional elements containing information in addition to icons 308 for application and/or feature invocation. A spreadsheet and/or table 312 may be rendered from information provided by a CMS. Data presented may include typical contact center report information, including but not limited to agent name, agent extension, time of the agent's last call, caller information (e.g., caller ID/telephone number), indicator as to whether the call was inbound or outbound, and the amount of time that the agent put the caller on hold.

Moreover, the information can be generated through one or more communications modes, APIs, channels, or facilities that are in communication with the mobile service observing module 132, such as but not limited to email, voice messaging, calendar information, reminders, tasks, instant messaging, text messaging, CMS metrics, statistics (KPIs), RSS feeds, and the like. The generated information may be provided by applications, native and/or third-party and shown on the smartphone display 304. A mobile contact center application on the device may provide queue information, including KPIs, detailed agent statistics, agent availability, etc. Examples of the mobile contact center application capabilities are more fully described in U.S. patent application Ser. No. 13/348,412, the entire contents of which are hereby incorporated herein by reference. Additional data transfer may be done over the Internet, via file sharing, via Bluetooth, data mapping, and additional forms of data query, sharing, and retrieval from servers, workstations, applications, and/or communication devices. The display 304 may also receive information in the form of images, video, text, and/or any data that the smartphone 128 can receive and process. The mobile service observing module 132 is operable to receive, transfer, pull, push, and aggregate data from multiple sources to the display 304.

Figure 4:
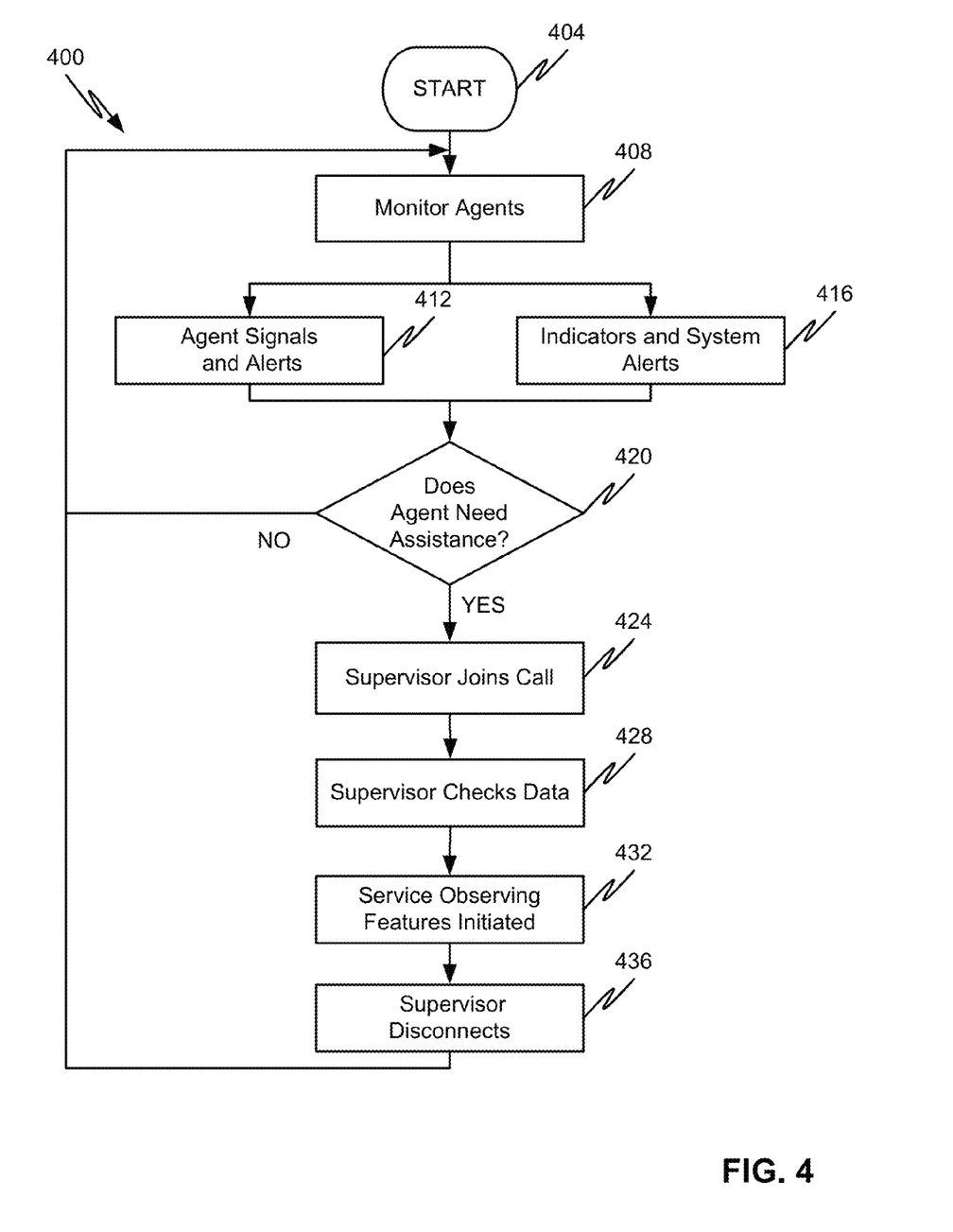
FIG. 4 depicts a flow diagram for a method for smart device integrated service observing in accordance with embodiments of the present disclosure.

The method 400 for smart device integrated service observing in accordance with embodiments of the present disclosure is shown in FIG. 4. Generally, the method 400 begins with a start operation 404 and runs as a continuous loop. While a general order for the steps of the method 400 are shown in FIG. 4, the method 400 can include more or fewer steps or the order of the steps can be arranged differently than those shown in FIG. 4. The method 400 can be executed as a set of computer-executable instructions executed by a computer system and encoded or stored on a computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 400 shall be explained with reference to the systems, components, modules, software, data structures, etc. described in conjunction with FIGS. 1-3.

Typically, the process monitors at step 408 to see how well agents 112 are handling work items. A supervisor 212 may log into a mobile contact center application to access contact center statistics with which to evaluate agents 112. Statistics might include, but are not limited to, Average Call Handle Time (ACHT) which may include total talk time and wrap time divided by the total number of calls, Service Level (SL %) which may indicate the percentage of calls answered within a certain amount of time (e.g., 30 seconds), Abandon Rate (ABN %) which may be the number of dropped calls divided by total incoming calls, Average Speed Answer (ASA) which may be the average number of seconds or minutes it takes to answer a call, Longest Wait Time (LWT) and Average Wait Time (AWT) for incoming calls, and Calls in Queue (CIQ) which may indicate how many calls are pending, waiting for agent 112 handling.

In step 412, the agent 112 may signal to the supervisor 212 that he has a problem. For example, Josh 112*c* may have a question about an application that he is using to run a test trace on a call. Josh 112*c* may raise his hand if Omar 212 is on the contact center floor 204, or Josh 112*c* may send Omar 212 an email if Omar 212 and Josh 112*c* are not collocated, and/or Josh 112*c* may send an SMS text, alert, or other message to Omar 212 on his smart communication device 128. For example, Josh 112*c* may send a text to Omar 212 that reads, "The dashboard is giving me some weird trunk information. Can you take a look at this with me?" In step 416, either independent of or concurrently with Josh 112*c* sending the communication to Omar 212, the CMS 136 may send an alert or a report to Omar 212, indicating that Josh 112*c* has a problem.

In step 420, the supervisor 212, the mobile service observing module 132, and/or the CMS 136 may make a determination that the agent 112*c* needs assistance. If the answer to the assistance query is no, the process returns to the start and may begin to monitor agents, in step 408. If the answer to the query is yes, the supervisor 212 may join the call, in step 424. In response to the need to join the call, the supervisor 212 may check data from the CMS 136, in step 428. The supervisor 212 may be able to check the work item ticket, thresholds, statistics, metrics, and/or see the agent's 112 desktop using native and/or third-party applications. If the supervisor 212 feels that action is warranted, the supervisor 212 may initiate service observing features, in step 432.

Omar 212, seeing that Josh 112*c* is struggling, may launch an application on his supervisor communication device 128. Omar 212 is able to access information from the mobile service observing module 132 and the CMS 136. Omar 212 is able to touch an icon 308*a*, allowing him to invoke the service observing feature Join Call. Omar 212 works with Josh 112*c* and a field agent, Len, to solve the problem. Once Omar 212 is sufficiently satisfied that Josh 112*c* has the issue in hand, Omar 212 may disconnect from the call, in step 436. Once Omar 212 disconnects in step 436, the process may loop back to the beginning, and monitoring agents may resume in step 408.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

What is claimed is:

1. A method, comprising:

providing a contact center supervisor with a communication device configured to interface with a plurality of electronic contact center data sources;

receiving a first set of contact center data from a first contact center data source, the first set of contact center data being received at the communication device via a first Application Programming Interface (API) and wherein the first set of contact center data comprises a metric of a conversation between a contact center agent and a customer and wherein the contact center agent is different from the supervisor;

receiving a second set of contact center data from a second contact center data source, the second set of contact center data being received at the communication device via a second API and wherein the second set of contact center data comprises a current context of the conversation between the contact center agent and the customer;

causing the first and second sets of contact center data to be displayed via a Graphical User Interface (GUI) of the communication device;

upon receiving a signal from the supervisor to the communication device, joining the supervisor to the exchange between the contact center agent and the customer without regard to the supervisor's location or proximity to the agent;

determining a location of the supervisor; and adjusting the data obtained from the first contact center data source based on the determined location of the supervisor.

2. The method of claim 1, wherein the first set of contact center data is displayed via the GUI as a default condition and wherein the second set of contact center data is displayed via the GUI in response to detecting that the contact center agent requires at least one of supervision and assistance in connection with servicing a work item.

3. The method of claim 2, wherein the first set of contact center data corresponds to performance data for the contact center agent.

4. The method of claim 2, wherein the second set of contact center data corresponds to at least one of a recording and transcription of an exchange between the contact center agent and the customer associated with the work item.

5. The method of claim 4, wherein the at least one of a recording and transcription is automatically provided to the supervisor based, at least in part, upon detecting that the contact center agent is not meeting at least one service objective.

6. The method of claim 4, wherein the second API includes a speech-to-text conversion capability and wherein the first API includes a database query capability.

7. The method of claim 4, further comprising:
providing the supervisor with the second set of contact center data;
determining that the supervisor has reviewed the second set of contact center data; and subsequent to determining that the supervisor has reviewed the second set of contact center data, thereby confirming that the supervisor is aware of a current context of conversation between the contact center agent and customer, joining the supervisor to the exchange between the contact center agent and the customer.

8. The method of claim 1, wherein the adjusting comprises changing a database query to the first contact center data source, thereby retrieving a modified first set of contact center data from the first contact center data source that is specific to the determined location of the supervisor.

9. A non-transitory computer-readable medium comprising processor-executable instructions, the instruction comprising:
instructions configured to provide, by a processor, a contact center supervisor with a communication device configured to interface with a plurality of electronic contact center data sources;
instructions configured to receive a first set of contact center data from a first contact center data source, the first set of contact center data being received at the communication device via a first Application Programming Interface (API) and wherein the first set of contact center data comprises a metric of a conversation between a contact center agent and a customer and wherein the contact center agent is different from the supervisor;
instructions configured to receive a second set of contact center data from a second contact center data source, the second set of contact center data being received at the communication device via a second API and wherein the second set of contact center data comprises a current context of the conversation between the contact center agent and the customer;
instructions configured to cause the first and second sets of contact center data to be displayed via a Graphical User Interface (GUI) of the communication device; and
instructions configured to cause, upon receiving a signal from the supervisor to the communication device, the joining of the supervisor to the exchange between the contact center agent and the customer without regard to the supervisor's location or proximity to the agent;
instructions configured to determine a location of the supervisor;
instructions configured to adjust the data obtained from the first contact center data source based on the determined location of the supervisor.

10. The non-transitory computer-readable medium of claim 9, wherein the first set of contact center data is displayed via the GUI as a default condition and wherein the second set of contact center data is displayed via the GUI in response to detecting that the contact center agent requires at least one of supervision and assistance in connection with servicing a work item.

11. The non-transitory computer-readable medium of claim 10, wherein the first set of contact center data corresponds to performance data for the contact center agent.

12. The non-transitory computer-readable medium of claim 10, wherein the second set of contact center data corresponds to at least one of a recording and transcription of an exchange between the contact center agent and the customer associated with the work item.

13. The non-transitory computer-readable medium of claim 12, wherein the at least one of a recording and transcription is automatically provided to the supervisor based, at least in part, upon detecting that the contact center agent is not meeting at least one service objective.

14. The non-transitory computer-readable medium of claim 12, wherein the second API includes a speech-to-text conversion capability and wherein the first API includes a database query capability.

15. The non-transitory computer-readable medium of claim 12, the instruction further comprising:
instructions configured to provide the supervisor with the second set of contact center data;
instructions configured to determine that the supervisor has reviewed the second set of contact center data;
subsequent to determining that the supervisor has reviewed the second set of contact center data, instructions configured to confirm that the supervisor is aware of a current context of conversation between the contact center agent and customer; and
instructions configured to join the supervisor to the exchange between the contact center agent and the customer.

16. The non-transitory computer-readable medium of claim 12, the instruction further comprising:
wherein the adjusting comprises changing a database query to the first contact center data source, instructions configured to retrieve a modified first set of contact center data from the first contact center data source that is specific to the determined location of the supervisor.

17. A communication system, comprising:
a mobile service observing module configured to provide a contact center supervisor with a communication device configured to interface with a plurality of electronic contact center data sources and performs the following operations:
receive a first set of contact center data from a first contact center data source, the first set of contact center data being received at the communication device via a first Application Programming Interface (API), wherein the first set of contact center data comprises a metric of a conversation between a contact center agent and a customer and wherein the contact center agent is different from the supervisor;

receive a second set of contact center data from a second contact center data source, the second set of contact center data being received at the communication device via a second API, wherein the second set of contact center data comprises a current context of the conversation between the contact center agent and the customer;

cause the first and second sets of contact center data to be displayed via a Graphical User Interface (GUI) of the communication device, wherein the first set of contact center data is displayed via the GUI as a default condition, wherein the second set of contact center data is displayed via the GUI in response to detecting that a contact center agent requires at least one of supervision and assistance in connection with servicing a work item;

upon receiving a signal from the supervisor to the communication device, joining the supervisor to the exchange between the contact center agent and the customer without regard to the supervisor's location or proximity to the agent;

determine a location of the supervisor; and adjust the data obtained from the first contact center data source based on the determined location of the supervisor.

18. The system of claim 17, further comprising:

a mobile service observing module configured to perform the following operations:

provide the supervisor with the second set of contact center data;

determine that the supervisor has reviewed the second set of contact center data; and subsequent to determining that the supervisor has reviewed the second set of contact center data, thereby confirm that the supervisor is aware of a current context of conversation between the contact center agent and customer, join the supervisor to the exchange between the contact center agent and the customer;

wherein the adjusting comprises changing a database query to the first contact center data source, thereby retrieve a modified first set of contact center data from the first contact center data source that is specific to the determined location of the supervisor.

19. The system of claim 17, wherein the device comprises at least one of a personal computer, laptop, tablet, cellular phone, smartphone, and telephone.

* * * * *